United States Patent Office 2,803,586  
Patented Aug. 20, 1957

2,803,586
pH CONTROL IN PRODUCTION OF FUMAGILLIN

Merlin H. Peterson and Alma W. Goldstein, Waukegan Township, Lake County, and Frank W. Denison, Jr., Lake Bluff, Ill., assignors to Abbott Laboratories, North Chicago, Ill., a corporation of Illinois No Drawing. Application June 29, 1953,  
Serial No. 364,956

7 Claims. (Cl. 195—81)

This invention relates to a new antibiotic and more particularly to the new antibiotic fumagillin and to a method for producing fumagillin.

Many therapeutically useful chemical compounds which are commonly designated as antibiotics have been obtained heretofore from the culture medium wherein certain microorganisms have been grown under carefully controlled conditions. In some instances antibiotics having activity against a very broad spectrum of pathogenic organisms are obtained while in other instances the antibiotic obtained has specific activity against a very small group of organisms. It is contemplated that greater emphasis and importance will be placed hereinafter on obtaining metabolites which are specific in their activity against certain undesirable pathogenic organisms without, however, interfering with the normal growth of desirable organisms.

It is an object of this invention to provide a new substance specifically active against intestinal protozoa.

It is also an object of this invention to provide a metabolite which is highly active against *Endamoeba histolytica*.

It is still another object of the invention to provide a metabolite substance that has anti-bacteriophage activity.

A still further object of the invention is to provide an improved fermentation process of producing fumagillin.

An additional object of the invention is to provide an improved process of recovering fumagillin.

Other objects of the invention will be apparent from the detailed description and claims to follow.

Fumagillin is a white crystalline solid organic carboxylic acid having a pH as shown by electrometric titration, of about 6.9 in chloroform-ethanol solution, and melts at about 190–192° C. in a capillary tube with decomposition. It is optically active, exhibiting an optical rotation $(\alpha)_D^{25}$ of $-27°$ (1% solution in 95% ethanol). It contains the elements carbon, hydrogen, and oxygen and has an empirical formula proximate to $C_{27}H_{36}O_7$ and $C_{26}H_{34}O_7$ and contains one free carboxyl group and an ester or other potential carboxyl group which can be liberated by heating with dilute alkali. The latter reaction mixture yields the compound decatetraenedioic acid which has four conjugated double bonds. When fumagillin is hydrogenated in an alcoholic solution, 5 moles of hydrogen are taken up. When hydrogenated in acetic acid solution with large amounts of platinum catalyst present, fumagillin takes up 7 moles of hydrogen. The molecular weight as calculated from its neutral equivalent and from the alkoxyl determination is in substantial agreement with either of the above formulae within experimental error. The analysis of the compound gives C, 68.1%; H, 7.4%; neutral equivalent, 474; and methoxyl, 7.3%. The ultra violet absorption spectrum of fumagillin in ethanol at a concentration of 0.004 gm./liter shows peaks at 239 m$\mu$, 304 m$\mu$ (flex), 322 m$\mu$ (flex), 335 m$\mu$ and 351 m$\mu$ with K values of 7.8 at 239 m$\mu$, 156.0 at 335 m$\mu$, and 146.5 at 351 m$\mu$. The infra red spectrum of a 5% solution of fumagillin in chloroform shows absorption bands at 3125, 1709, 1633, 1600, 1577, 1490, 1377, 1231, 1164, 1125, 1010, and 835 cm.$^{-1}$.

The crystallographic system of fumagillin is biaxial positive. The pleochroic formula of fumagillin crystals is colorless for the alpha ray (fast) and iridescent greenish-tan for the gamma ray (slow). When white light is thrown onto a crystal of fumagillin perpendicular to the direction of microscopic examination, a very deep iridescent purple hue is observed on the crystal faces. The refractive indices with white light as determined by the Becke-line method using Shillaber's refractive index liquids in conjunction with methylene iodide are alpha, 1.519; beta, 1.555; and gamma, 1.74.

The organism which produces the new antibiotic fumagillin was isolated from a soil sample obtained in the Illinois State Park, Zion, Illinois. Structurally and functionally this organism is found in the soil as a member of the *Aspergillus fumigatus* series as defined by Thom and Raper; "Manual of Aspergilli," Williams and Wilkins; Baltimore, Md., 1945; pages 87–91 and is a distinct strain from the type strain *A. fumigatus* NRRL 163. The close relationship between the applicants' organism designated as *A. fumigatus* NRRL 2436 and the organism *A. fumigatus* H-3 is shown in the following data of Table I.

TABLE I
Morphological comparison [1] of two strains of *Aspergillus fumigatus*

| Morphological Characteristics | *Aspergillus fumigatus* NRRL 2436 | *Aspergillus fumigatus* H-3 |
|---|---|---|
| Colony: | | |
|   color (aerial) | white turning dark pine green. | white turning dark jade gray. |
|   color (substratum) | pastel to melon yellow | light citron yellow. |
|   type of growth | moderately spreading—velvety. | spreading, floccose. |
|   sporulation | abundant | moderate. |
| Conidial Head: | | |
|   shape | compact, columnar | compact, columnar. |
|   length | 70$\mu$ to 95$\mu$ | 75$\mu$ to 125$\mu$. |
|   diameter | 30$\mu$ to 40$\mu$ | 35$\mu$ to 60$\mu$. |
| Conidiophore: | | |
|   length | 70$\mu$ to 650$\mu$ | 35$\mu$ to 400$\mu$. |
|   diameter | 2.5$\mu$ to 5.5$\mu$ | 2.5$\mu$ to 7.0$\mu$. |
|   color | green | green. |
|   wall | smooth | smooth. |
| Visicle: | | |
|   shape | flask shaped, upper one-half fertile. | flask shaped, upper one-half fertile. |
|   diameter | 12$\mu$ to 20$\mu$ | 14$\mu$ to 20$\mu$. |
| Sterigmata: | | |
|   arrangement | in one series, parallel to axis of conidiophore, crowded. | in one series, parallel to axis of conidiophore, crowded. |
|   length | 5$\mu$ to 7.5$\mu$ | 4.5$\mu$ to 7.5$\mu$. |
|   diameter | 1.5$\mu$ to 2.5$\mu$ | 1.5$\mu$ to 2.5$\mu$. |
| Conidia: | | |
|   color | green | green. |
|   shape | globose, echinulate | globose, echinulate. |
|   diameter | 2.5$\mu$ to 3.0$\mu$ | 2.5$\mu$ to 3.5$\mu$. |

[1] Color nomenclature: Jacobson, Eghert, Granville, Walter C., Foss, Carl F., 1948 "Color Harmony Manual," third edition, Container Corporation of America, Chicago, Illinois.

Each of the foregoing strains of *Aspergillus fumigatus* was grown by inoculating a culture medium (Czapek's agar solution [1]) with spores from cultures grown on sporulation agar inoculated from soil stock, said sporulation agar containing the following ingredients:

| | | |
|---|---|---|
| Glycerol | g | 30.0 |
| Molasses (Green Label Brer Rabbit) | g | 37.5 |
| MgSO$_4$.7H$_2$O | g | 0.20 |
| KH$_2$PO$_4$ | g | 0.24 |
| NaCl | g | 16.0 |
| FeSO$_4$.7H$_2$O | g | 0.012 |
| CuSO$_4$.5H$_2$O | g | 0.004 |
| CaCO$_3$ | g | 1.0 |
| Curbay B. G. | g | 10.0 |
| Peptone | g | 20.0 |
| Tap water, q. s. | ml | 1000.0 |

The foregoing is diluted 1:4 with tap water and there-

[1] Thom, Charles and Raper, Kenneth B., 1945, "A Manual of the Aspergilli," William and Wilkins Company, Baltimore, Md.

after 2% agar is added. The cultures on Czapek's agar solution are incubated at a temperature of 28° C. for a period of 15 days, whereupon the foregoing morphological observations were made.

The determination of the presence and concentration of the antibiotic of the present invention in fermentation liquors and in other solutions is based on the effect of fumagillin on (1) *E. histolytica*; (2) Bacteriophage, *S. aureus*; and (3) ultra violet light absorption.

E. HISTOLYTICA ASSAY

*Preparation of E. histolytica Amoeba Test Solutions*

In several tubes is placed a 10 ml. volume of Balamuth's Egg Yolk Infusion Broth [2] which is buffered to a pH of 7.4. Immediately prior to the use of the foregoing medium one loopful of sterile rice powder (Difco) is added per tube and the tube placed in a 37° C. water bath. The inoculum is prepared by growing 5 or 6 cultures (48 to 72 hours) of *Endamoeba histolytica* (NRS strain with mixed bacterial flora obtained from Dr. Balamuth of Northwestern University). The several cultures are pooled in egg infusion medium and immediately before inoculation the combination culture is shaken to distribute the trophozoites evenly.

*Amebastatic assay method*

A series of tubes is inoculated with 0.5 ml. pooled inoculum and incubated for 6 hours at 37° C. To three of these tubes is then added the following amounts of undiluted filtrate:

0.5 ml. (approx. 1–20 dil. solution)
0.2 ml. (approx. 1–50 dil. solution)
0.1 ml. (approx. 1–100 dil. solution)

If the filtrate exhibits antibiotic activity at the above dilutions, higher dilutions are prepared and tested in the foregoing manner.

When the test filtrate shows activity in all dilutions in the foregoing preliminary test, a 1–100 dilution is employed as designated below in a series of three test tubes containing the pooled inoculum which has been incubated for 6 hours at 37° C.:

0.5 ml. (approx. 1–2,000 dil. solution)
0.2 ml. (approx. 1–5,000 dil. solution)
0.1 ml. (approx. 1–10,000 dil. solution)

To the next three tubes containing the same inoculum medium is added the following amount of a 1–1,000 dilution of the filtrate:

0.5 ml. (approx. 1–20,000 dil. solution)
0.2 ml. (approx. 1–50,000 dil. solution)
0.1 ml. (approx. 1–100,000 dil. solution)

To the last three tubes containing the identical inoculum is added the following amount of a 1–10,000 dilution of the filtrate:

0.5 ml. (approx. 1–200,000 dil. solution)
0.2 ml. (approx. 1–500,000 dil. solution)
0.1 ml. (approx. 1–1,000,000 dil. solution)

If the filtrate exhibits antibiotic activity at the above dilutions, increasingly higher dilutions are prepared and tested in the foregoing manner until the minimum inhibitory dilution is determined.

As a control two tubes are employed containing 0.5 ml. of the above identified inoculum. After 48 hours incubation at 37° C. the wet mounts are examined microscopically to determine the presence of motile trophozoites and the results recorded. As a further control a subculture of 0.5 ml. of the lowest concentration showing antibiotic activity and a subculture of the concentration above and below the first mentioned lowest concentration is prepared. After incubating each of the foregoing cultures for 48 hours at 37° C. the said mounts are examined microscopically to determine the presence of motile trophozoites and the results are recorded.

MICROBIOLOGICAL ASSAY

The microbiological assay for fumagillin utilizes the ability of fumagillin to inhibit *Staphylococcus* phage activity in a paper disc-plate assay procedure. Appropriate dilutions of fumagillin are pipetted into paper discs placed on agar seeded with a mixture of sensitive cells of *Staphylococcus aureus* and homologous phage. After incubation of the plates, measurable zones of growth are obtained around the discs. These zones are proportional to the concentration of fumagillin in the solution which has been added to the disc.

*Preparation of phage stock*

Aliquots (100 ml.) of broth medium having the following composition:

| | | |
|---|---|---|
| Peptone | g | 5.0 |
| NaCl | g | 5.0 |
| Beef extract | g | 3.0 |
| Distilled water | ml | 1000.0 | are inoculated with 0.5% by volume of an 18–24 hour broth culture of the test organism, *Staphylococcus aureus* #209. The stationary flask culture is incubated for 7–8 hours at 37° C. An active phage stock suspension is then added at a 5% by volume level and the flask culture incubated on a reciprocating shaker for 5 hours at 37° C. The shaken culture is filtered through a Seitz filter and the filtrate used for the assay plates as described hereinafter.

*Preparation of inoculum culture*

An agar medium is prepared by solidifying the above broth medium with 1.25% agar. A 24 hour agar medium slant culture of *Staphylococcus aureus* #209 is then used to inoculate 10 ml. broth medium in standard 18 x 150 mm. test tubes. After 18–24 hours incubation at 37° C. the broth culture is ready for seeding of the plate agar.

*Preparation of fumagillin standard solution*

A standard solution of 100 mcg. activity/ml. is prepared in acetone with material standardized by spectroscopic assay. Dilutions from the foregoing stock solution are made to obtain concentrations of 10.0, 5.0, and 1.25 mcg./ml. in water for determination of a standard curve. All solutions of fumagillin are shielded from light at each step of the assay procedure and plates are covered with a black cloth at the time assay discs are applied and during incubation.

*Plating procedure*

Pressed bottom Petri dishes are poured on a level surface with 5.0 ml. of agar medium seeded at 48–50° C. with 1.0% by volume of the inoculum culture and 3% by volume of phage stock filtrate. Plates are poured daily and refrigerated until the time of use.

Standard solutions, and unknown samples diluted to a theoretical 5.0 mcg./ml. potency, are prepared and 0.09 ml. of each dilution is added to the paper discs (Schleicher and Schuell) as the discs are placed on the plated agar. Four discs are used on each plate, 2 discs of the unknown and 2 discs of the standard 5 mcg./ml. solution. Ten plates with each of the 4 standard solutions are used in the determination of the standard curve and 2 or more replicate plates for each of the unknown samples.

The plates are incubated for 16–18 hours at 37° C. and the zones are read on a Fisher-Lilly Antibiotic Zone Reader. Average growth zone diameter from the standard fumagillin solutions are plotted against the log of concentration on semi-logarithmic paper and a standard curve drawn. Unknown sample potencies are determined from

---

[2] Balamuth, W., "American Journal of Pathology," 16, 380–384, 1946.

a curve of the same slope adjusted for plate variation of the same 5.0 mcg./ml. standard solution.

ULTRA VIOLET ASSAY

A sample of fermentation beer or solution containing fumagillin is adjusted to a pH of 8.0 with 10 normal sodium hydroxide and filtered through a Whatman #41 filter paper to produce an absolutely clear filtrate. A 2 ml. sample of the filtrate is transferred to a test tube containing 5 ml. amyl acetate and acidified with 0.5 ml. of 2% sulfuric acid. The test tube is then shaken vigorously for at least one minute. A 1 ml. volume of the above amyl acetate layer is transferred to a 50 ml. volumetric flask and diluted to a 50 ml. volume with ethyl alcohol.

In order to establish a standard curve and when analyzing a solid sample of fumagillin, a 10 mg. sample of the solid material is carefully weighed in a 10 ml. volumetric flask. In order to effect solution of the sample, 1 ml. of chloroform is added to the volumetric flask and the solution brought to a 10 ml. volume by adding ethyl alcohol thereto. A 1 ml. volume of the alcohol-chloroform solution is placed in a 500 ml. volumetric flask and the solution diluted to a 500 ml. volume with ethyl alcohol.

Samples prepared in the above manner are examined with a Beckman spectophotometer using ethyl alcohol as the blank to determine the ultra violet absorption at 335 m$\mu$. With a standard curve showing the optical density at 335 m$\mu$ versus concentration obtained for pure crystalline fumagillin in the above described manner, the potencies of the test samples are readily determined.

The antibiotic fumagillin of the present invention is prepared by cultivating a fumagillin producing strain of *A. fumigatus*, *A. fumigatus* NRRL 2436, under submerged aerobic conditions in a nutrient medium containing a carbohydrate, corn steep solids, calcium carbonate, and sufficient sodium carbonate to adjust the final pH of the medium to about pH 6.0. The fumagillin thus produced is isolated from the culture medium by extraction with a suitable solvent and purifying the crude product thus obtained.

EXAMPLE I

*Preparation of test tube agar spore slant cultures*

Test tube agar spore slant cultures of *Aspergillus fumigatus* NRRL 2436 are prepared in the following manner. Standard 18 x 150 mm. test tubes each containing 8–10 ml. of the folowing medium:

| | | |
|---|---|---|
| Molasses (blackstrap) | g | 9.4 |
| Peptone | g | 5.0 |
| Glycerol | g | 7.5 |
| Curbay B. G. | g | 2.5 |
| MgSO$_4$.7H$_2$O | g | 0.05 |
| KH$_2$PO$_4$ | g | 0.06 |
| NaCl | g | 4.0 |
| FeSO$_4$.7H$_2$O | g | 0.003 |
| CuSO$_4$.5H$_2$O | g | 0.001 |
| CaCO$_3$ | g | 0.25 |
| Agar | g | 20.0 |
| Tap water, q. s. | ml | 1000.0 | are sterilized for 35 minutes at 120° C. and slanted while still fluid. After the test tube agar slants have cooled and solidified, they are inoculated directly from soil stock cultures or lyophilized stock cultures. One inoculating loopful of stock culture is evenly spread over the surface of one test tube agar slant. The inoculated agar slant is incubated at 24° C for 7 days.

Second generation agar spore slant cultures are prepared by subculturing the foregoing first generation agar spore slant cultures on fresh test tube agar slants of the same sporulation medium. These second generation agar slants are incubated for 6 days at 24° C. and then stored at 2° C. until used.

*Preparation of bran bottle spore cultures*

Two-liter diphtheria toxin bottles each containing 50 g. of the following sporulation medium:

| | | |
|---|---|---|
| Glycerol | g | 30.0 |
| Molasses (Brer Rabbit green label) | g | 37.5 |
| Peptone | g | 20.0 |
| Curbay B. G | g | 10.0 |
| NaCl | g | 16.0 |
| CaCO$_3$ | g | 1.0 |
| MgSO$_4$.7H$_2$O | g | 0.2 |
| KH$_2$PO$_4$ | g | 0.24 |
| FeSO$_4$.7H$_2$O | g | 0.012 |
| CuSO$_4$.5H$_2$O | g | 0.004 |
| Tap water | ml | 1000.0 |
| Wheat bran | g | 1500.0 | are sterilized for one hour at 120° C. After cooling, each bottle is inoculated directly from one second generation test tube agar spore slant culture prepared as described above. The transfer of the vegetative growth and spores of the agar spore slant cultures is effected by adding 10 ml. of sterile distilled water to each agar slant spore culture. The vegetative growth and spores are then suspended in the sterile water by gently scraping with a sterile inoculating loop. The entire aqueous suspension from one test tube agar spore slant culture is then pipetted directly onto the bran contained in one two-liter diphtheria toxin bottle. After inoculation the contents of each bran bottle are thoroughly mixed and the bottles are then laid on their sides in the 28° C. incubator with even distribution of the bran mixture over their inner large lower side surfaces. After 7 days with no disturbance in the incubator, the bran bottle cultures should be well sporulated. They are then stored in the cold room 2° C.) for three days before using.

*Preparation of vegetative inoculum*

One bran bottle sport culture prepared as described above is used as inoculum in the preparation of 200 gallons of vegetative inoculum in a 500 gallon fermentation tank. Three days prior to the time of use the bran bottle spore culture is removed from the cold room and 1 liter of the following sterility testing medium is added aseptically:

| | | |
|---|---|---|
| Peptone | g | 3.0 |
| Beef extract | g | 3.0 |
| Glucose | g | 5.0 |
| Yeast extract | g | 1.0 |
| Distilled water q. s | ml | 1000.0 |
| Brom Thymol Blue (1% alcohol solution) | ml | 1.0 |

The bottle is then held in the 28° C. incubator for a 72 hour sterility testing period during which time the added sterility medium is checked visually for evidence of contamination, as indicated by growth or a change of indicator color from green to yellow. If no evidence of contamination presents itself at the end of the sterility testing period, the entire contents of the bran spore bottle is used to inoculate 200 gallons of the following medium which has been sterilized at 120° C. for 60 minutes.

| | G./l. |
|---|---|
| Corn steep solids | 25 |
| Glucose | 30 |
| Calcium carbonate | 10 |

The inoculated medium is incubated for approximately 27 hours at a temperature of 26° C. under agitation by an impeller rotating at 200 R. P. M. and aerated at a rate of 20 C. F. M. An antifoam agent of the type used in the penicillin fermentation is added as required.

*Production of fumagillin*

A fermentation medium comprising 4600 gallons of the above specified sterile corn steep-glucose-calcium carbonate medium in a 6000 gallon fermentation tank is adjusted to pH 6.0 with sodium carbonate prior to sterilization and thereafter inoculated with 200 gallons of vegetative inoculum of *Aspergillus fumigatus* NRRL 2436 as prepared above. The inoculated medium is incubated for approximately 108 hours at a temperature of 26° C. and agitated by an impeller rotating at 114 R. P. M. and aerated at a rate of 500 C. F. M. An antifoam agent of the type used in penicillin fermentation is used as required. The fermentation yield of fumagillin obtained in the above fermentation process is shown in column 1 of Table II.

*Recovery of fumagillin from fermentation medium*

The clarified liquid obtained from the fermentation medium (beer) by filtration in any of the usual apparatus for removing mycelia and suspended solids from fermentation beers, after first adjusting the pH of the contents of the fermentation tank to above about pH 7.0 and preferably to between pH 7.5 and pH 8.5 with, for example, the addition of an alkaline material such as sodium carbonate, is intimately mixed with hexane with a Podbielniak extractor and the hexane layer containing undesirable fatty material discarded. The pH of the defatted liquid is adjusted to about pH 3 by the addition of $H_2SO_4$, and the defatted liquid is extracted with chloroform. The chloroform is removed under reduced pressure without external heating. After the removal of all of the chloroform the residual syrup is dissolved in acetone. The acetone solution is cooled to 5° C. whereupon a small quantity of brown precipitate separates which is removed by filtration. The precipitate is washed with acetone and the washings added to the original filtrate. A portion of the above acetone solution is concentrated under reduced pressure at room temperature under an atmosphere of nitrogen. The resulting thick suspension is placed in a 1 liter centrifuge cup, under nitrogen, and cooled at −30° C. for 18 hours. The suspension is centrifuged for one hour at 1500 to 1700 R. P. M. The supernatant liquid is decanted from the residual solids which are washed 5 times at room temperature with several portions of tertiary butanol. A residual solid material remains after the tertiary butanol wash and after drying at room temperature. This material after recrystallization from a mixture of equal parts of water and of methanol has a melting point of 190–192° C. when taken in a capillary tube and the other physical and chemical properties previously recited.

EXAMPLE II

The seed culture and vegetative inoculum of *A. fumigatus* NRRL 2436 are prepared in the same manner as described in Example I and the same proportions of the sterile glucose—steep medium and the same general fermentation procedure as described in Example I are used. As a modification in the fermentation process described above, however, 200 gallons of sterile aqueous glucose solution is added when the pH of the fermentation culture reaches about pH 7.2 (after about 44 hours of fermentation). The volume of glucose solution added is such that the concentration in the fermenting culture immediately after addition is increased by 2.0%. As indicated in the following table, the glucose supplement maintains the pH of the fermentation medium within the range of about pH 6.8–pH 7.4 which has been found to provide greatly increased yields of fumagillin. The fermentation yield of fumagillin obtained is shown in Column 2 of Table II.

TABLE II

*Fermentation data*

| Age of Fermentation, hours | Column 1 Without Glucose Feed (Example I) Fumagillin Production | | | Column 2 With Glucose Feed at pH 7.2 (44 hours) (Example II) Fumagillin Production | | |
|---|---|---|---|---|---|---|
| | pH | S. aureus Phage Assay, mcg./ml. | Ultra Violet Assay, mcg./ml. | pH | S. aureus Phage Assay, mcg./ml. | Ultra Violet Assay, mcg./ml. |
| 0 | 5.6 | | | 5.9 | | |
| 17 | 5.9 | 9.9 | | 6.1 | | 19 |
| 41 | 7.6 | 116 | | 7.1 | | 165 |
| 65 | 8.6 | 174 | | 6.7 | | 250 |
| 89 | 8.4 | 162 | | 6.9 | | 408 |
| 108 | 8.4 | 156 | 157 | 7.5 | 372 | 420 |

It is evident from the data disclosed in the foregoing table that the addition of an acid producing carbohydrate material at an intermediate point during the fermentation of the organism *A. fumigatus* is capable of maintaining the pH of the fermentation medium at approximately the neutral point and substantially increases the fermentation yield of fumagillin above that obtained when no acid producing substance is incorporated in the medium during the fermentation process.

In the fermentation procedures and fermentation media employed for the production of fumagillin, it has been observed that to achieve the desired yields of fumagillin the fermentation reaction should be allowed to proceed for a period of about 60 to 100 hours while maintaining a pH below about pH 75° at a temperature of about 20–32° C. and preferably between about 24–26° C.

While in the specific examples a fermentation medium is employed which comprises corn steep solids, glucose, and calcium carbonate, it should be understood that other materials can be satisfactorily employed. For example, in place of corn steep solids as a source of nitrogen and necessary minerals, sodium nitrate or peptone and other similar nitrogen containing materials which have been used heretofore in antibiotic fermentation processes have been employed. Similarly, in place of glucose as the carbon source, dextrin, cerelose, brown sugar, or the like, have been used. It should also be understood that the necessary minerals required for satisfactory growth of the fumagillin producing organism are obtained in the required amounts from the tap water, corn steep solids, and the other components of the medium.

In addition to using a fermentation medium comprised essentially of natural ingredients, fumagillin has also been obtained in good yields by fermenting, in accordance with the herein disclosed specific examples, a synthetic fermentation medium having the following composition:

| | | |
|---|---|---|
| $NaNO_3$ | g./l | 3.0 |
| $MgSO_4 \cdot 7H_2O$ | g./l | 0.5 |
| $K_2HPO_4$ | g./l | 1.0 |
| KCl | g./l | 0.5 |
| $FeSO_4 \cdot 7H_2O$ | g./l | 0.01 |
| Starch | g./l | 15.0 |
| Sucrose | g./l | 30.0 |
| Distilled water, q. s. | ml | 1000.0 |

It should also be understood that the innocuous acid-controlling material which is capable of controlling the pH of the fermentation medium when added thereto during the fermentation process can be added intermittently during the course of fermentation in small amounts as required to maintain the pH of the medium below about pH 7.5 or as a single large addition, such as illustrated in Example II wherein glucose is added in an amount comprising 2% of the volume of the fermentation medium.

The amoebastatic activity of fumagillin against *Enda*-

*moeba histolytica* is demonstrated in the following manner: A sample of fumagillin is dissolved in a small amount of acetone and diluted to the appropriate concentration with physiological salt solution. Dilutions of the sample are prepared to give approximately two-fold dilutions in Balamuth's Egg Yolk Infusion Broth ranging from 1:1,000,000; 1:2,000,000,000. Culture tubes containing the proper dilutions in the medium are prepared and inoculated with 48 to 72 hour cultures of *E. histolytica* with mixed bacterial flora. The tubes are incubated at 37° C. for 48 hours and examined microscopically for the presence or absence of living amoeba. Subcultures are made and incubated at 37° C. for 48 hours and examined microscopically for living amoeba. The minimum inhibitory concentration is the dilution which shows no evidence of living amoeba in both the original culture and the subculture. In the fumagillin produced in accordance with Examples I and II the minimum inhibitory concentration observed is approximately 1:500,000,000.

Others may readily adapt the invention for use under various conditions of service, by employing one or more of the novel features disclosed or equivalents thereof. As at present advised with regard to the apparent scope of our invention, we desire to claim the following subject matter.

We claim:

1. In a process which comprises aerobically fermenting an aqueous antibiotic nutrient medium containing an adequate source of carbon, nitrogen, and necessary minerals and inoculated with a culture of a fumagillin producing strain of *Aspergillus fumigatus* and recovering the fumagillin produced therefrom, the improved step comprising; adding to the fermentation medium during the fermentation process when the pH of the said medium has a value in excess of about pH 7 and before the pH of the said medium is appreciably in excess of about pH 7.5 a small amount of an acid producing carbohydrate adapted to being oxidized during the said fermentation by the said culture to form acidic products which maintain the pH below a maximum of 7.5 during the course of the fermentation process; whereby the normal increase in alkalinity of the fermentation medium is inhibited and the adverse effect of alkaline conditions upon the fumagillin fermentation yield is overcome.

2. In a process which comprises aerobically fermenting an aqueous antibiotic nutrient medium containing an adequate source of carbon, nitrogen, and necessary minerals and inoculated with a culture of *Aspergillus fumigatus* NRRL 2436 and recovering the fumagillin produced therefrom, the improved step comprising; adding to the fermentation medium during the fermentation process when the pH of the said medium has a value in excess of about pH 7 and before the pH of the fermentation medium is appreciably in excess of about pH 7.5 a small amount of an innocuous acid producing carbohydrate which is gradually oxidized during the fermentation process by the said culture to form acidic products which maintain the pH below a maximum pH of 7.5 during the course of the fermentation process; whereby the normal increase in alkalinity of the fermentation medium is inhibited and the adverse effect of alkaline conditions upon the fumagillin fermentation yield is overcome.

3. In a process which comprises aerobically fermenting an aqueous antibiotic nutrient medium containing an adequate source of carbon, nitrogen, and necessary minerals and inoculated with a culture of a fumagillin producing strain of *Aspergillus fumigatus* and recovering the fumagillin produced therefrom, the improved step comprising; adding to the fermentation medium during the fermentation process when the pH of the said medium has a value in excess of about pH 7 and before the pH of the fermentation medium is appreciably in excess of about pH 7.5 a small amount of fermentable sugar which is gradually oxidized during the fermentation process by the said culture to form acidic products which maintain the pH below a maximum pH of 7.5 during the course of the fermentation process; whereby the normal increase in alkalinity of the fermentation medium is inhibited and the adverse effect of alkaline conditions upon the fumagillin fermentation yield is overcome.

4. In a process which comprises aerobically fermenting an aqueous antibiotic nutrient medium containing an adequate source of carbon, nitrogen, and necessary minerals and inoculated with a culture of a fumagillin producing strain of *Aspergillus fumigatus* and recovering the fumagillin produced therefrom, the improved step comprising; adding to the fermentation medium during the fermentation process when the pH of the said medium has a value in excess of about pH 7 and before the pH of the fermentation medium is appreciably in excess of about pH 7.5 a small amount of glucose which is gradually oxidized during the fermentation process by the said culture to form acidic products which maintain the pH of the said medium below about pH 7.5; whereby the normal increase in alkalinity of the fermentation medium is inhibited and the adverse effect of alkaline conditions upon the fumagillin fermentation yield is overcome.

5. In a process which comprises aerobically fermenting an aqueous antibiotic nutrient medium containing an adequate source of carbon, nitrogen, and necessary minerals and inoculated with a culture of a fumagillin producing strain of *Aspergillus fumigatus* and recovering the fumagillin produced therefrom, the improved step comprising; adding to the fermentation medium intermittently during the fermentation process when the pH of the said medium has a value in excess of about pH 7 and before the pH of the fermentation medium is appreciably in excess of about pH 7.5 a small amount of glucose which is gradually oxidized during the fermentation process by the said culture to form acidic products which maintain the pH of the said medium below about pH 7.5; whereby the normal increase in alkalinity of the fermentation medium is inhibited and the adverse effect of alkaline conditions upon the fumagillin fermentation yield is overcome.

6. In a process which comprises aerobically fermenting an aqueous antibiotic nutrient medium containing an adequate source of carbon, nitrogen, and necessary minerals and inoculated with a culture of a fumagillin producing strain of *Aspergillus fumigatus* and recovering the fumagillin produced therefrom, the improved step comprising; adding to the fermentation medium during the fermentation process when the pH of the said medium has a value in excess of about pH 7 and before the pH of the fermentation medium is appreciably in excess of about pH 7.5 glucose which is gradually oxidized during the fermentation process by the said culture to form acidic products in an amount comprising about 2% by volume of the fermentation medium to maintain the pH of the said medium below about pH 7.5; whereby the normal increase in alkalinity of the fermentation medium is inhibited and the adverse effect of alkaline conditions upon the fumagillin fermentation yield is overcome.

7. In a process which comprises aerobically fermenting an aqueous antibiotic nutrient medium containing an adequate source of carbon, nitrogen, and necessary minerals and inoculated with a culture of a fumagillin producing strain of *Aspergillus fumigatus* and recovering the fumagillin produced therefrom, the improved steps comprising; adding to the fermentation medium during the fermentation process when the pH of the said medium has a value in excess of about pH 7 and before the pH of the fermentation medium is appreciably in excess of about pH 7.5 a small amount of glucose to maintain the pH below a maximum pH of 7.5 during the course of the fermentation process, and thereafter adjusting the pH of the fermentation medium containing mycelia, suspended solids and fumagillin to a pH of at least about pH 7.0 before separating the mycelia and suspended solids from the fumagillin in the fermentation medium; whereby increased yields of fumagillin are obtained.

References Cited in the file of this patent

UNITED STATES PATENTS 2,652,356   Hanson et al. _____ Sept. 15, 1953

OTHER REFERENCES

Hanson et al.: Jour. Bact., 58, 1949, pages 527–529.

Asheshov et al.: British Jour. Exptl. Path., 30, 1949, pages 175–179.

McCowen et al.: Science, 113, Feb. 23, 1951, pages 202–3.

Anderson: Squibb Abst. Bull., vol. 24, No. 22, May 30, 1951, page A–465.

Science Newsletter, Jan. 26, 1952, page 55.

Asheshov et al.: Antibiotics and Chemotherapy, July 1952, pages 361, 362, 366 to 374.

Hrenoff et al.: J. Phar. & Exptl. Therap., December 1952, pages 396–397.

Science Newsletter, Feb. 14, 1953, page 99.